United States Patent [19]

Wolff et al.

[11] Patent Number: 4,896,728
[45] Date of Patent: Jan. 30, 1990

[54] FIRE SPRINKLERS WITH FRANGIBLE BODY CLOSING A FLOW PASSAGE AND SEPARATE MEANS FOR SHATTERING SAME

[75] Inventors: Heinz S. Wolff, London; David W. Hawes, Cuckfield, both of England

[73] Assignee: Thomas Bolton & Johnson Limited, Staffordshire, England

[21] Appl. No.: 249,129

[22] Filed: Sep. 26, 1988

[30] Foreign Application Priority Data

Oct. 2, 1987 [GB] United Kingdom ............... 8723226

[51] Int. Cl.$^4$ .............................................. A62C 37/08
[52] U.S. Cl. ........................................ 169/37; 169/26; 169/38
[58] Field of Search ........................... 222/5; 428/410; 239/309; 169/37, 19, 26, 58, 57, 38

[56] References Cited

U.S. PATENT DOCUMENTS

| | | | |
|---|---|---|---|
| 2,441,011 | 5/1948 | Dodelin | 169/26 |
| 3,547,201 | 12/1970 | Balmes | 169/26 |
| 3,834,463 | 9/1974 | Allard et al. | 169/28 |
| 4,006,780 | 2/1977 | Zehr | 169/26 |
| 4,282,931 | 8/1981 | Golber | 169/26 |

FOREIGN PATENT DOCUMENTS 480300 2/1975 Australia .
0131997 1/1985 European Pat. Off. .
2187951A 9/1987 United Kingdom .

OTHER PUBLICATIONS

Edwin Waldbusser, the Use of Shape and Memory Alloys to Improve Semi-Conductor Industry Fire Safety, Journal of the Semi-Conductor Safety Association Aug. 1987, pp. 34–35.
Battelle Memorial Institute Final Report on Development of a Nitinol-Actuated Fire Sprinkler Disclosed to Federal Emergency Management Agency Sept. 15, 1982.

Primary Examiner—Joseph F. Peters, Jr.
Assistant Examiner—Anne Sartelle
Attorney, Agent, or Firm—Oliff & Berridge

[57] ABSTRACT

A fire sprinkler has a flow passage for water or other extinguishing fluid closed by a frangible body, which may be a simple disc. A separate mechanism responsive to temperature-rise conditions shatters the frangible body, and the fluid then flows from the passage to impinge on a distributor (as in conventional sprinklers). The shattering mechanism is preferably actuated by a shape-memory alloy, preferably in sheet form, which can be located below the distributor for maximum exposure to radiant as well as convective heat; it can also be thermally insulated, contributing further to speed of response.

9 Claims, 9 Drawing Sheets

FIRE SPRINKLERS WITH FRANGIBLE BODY CLOSING A FLOW PASSAGE AND SEPARATE MEANS FOR SHATTERING SAME

This invention arises out of a research program conducted on the Applicant's behalf by the Institute for Bioengineering of Brunel University (of Uxbridge, Middlesex, UB8 3PH England), whose contribution is gratefully acknowledged.

The invention relates to sprinklers for fire protection.

The essential functions of a fire sprinkler are to detect and react to radiant and/or convective heat attributable to fire conditions (without reacting to innocuous heat, such as from the sun) and to distribute extinguishing fluid (usually water) over the whole area protected as soon as possible after fire conditions arise and certainly before the air movements caused by the fire are strong enough to blow the extinguishing fluid away.

Current sprinklers are of two classes; one relies on the use of a glass bulb which shatters due to generation of pressure by heating of a liquid within to release extinguishing fluid; the other uses a mechanical valve, biased open by a spring but retained closed by a link of a low-melting solder alloy. In both cases the response speed is restricted by the fact that the detecting material (the fluid and the solder alloy respectively) cannot (or at least cannot readily) be exposed directly to the radiant heat of a fire, owing to the need to have a fluid distributor downstream of (usually below) the fluid exit, and by the fact that it is necessarily in good thermal contact with the metal body of the sprinkler, with a pipe system and with fluid therein, which have a significant combined thermal capacity.

The present invention provides a new class of fire sprinkler in which the heat detecting element can be directly exposed to radiant as well as convective heat, can have a large exposed area for maximum heat gathering, and can be thermally insulated by use of polymeric, ceramic or vitreous material as the circumstances of the installation require. It also makes possible designs in which the heat detecting element can be removed and replaced, either for testing or as a precaution against ageing, or in order to change the sensitivity of the sprinkler (e.g., when the materials stored in a warehouse change) without cutting off the supply of fluid and therefore without needing to disable more than one sprinkler at a time.

The sprinkler in accordance with the invention comprises a flow passage extending from an inlet to an outlet, a fluid distributor positioned beyond the outlet, a frangible body cloning the flow passage, and separate temperature-responsive means for shattering the frangible body to allow passage of fluid on detection of predetermined temperature-rise conditions.

Preferably a temperature-responsive element of a shape-memory alloy, such as the nickel-titanium one, is used to actuate the shattering means. Preferably the alloy is in sheet or other extended form for maximum heat uptake. A particularly preferred form is that of a sheet distorted into a dome and recoverable towards (ideally to) a flat sheet form: this is capable of generating ample force. It can be treated (by coating, etching or the like) to enhance the thermal emissivity of its surface.

Preferably the fluid distributor is located between the outlet and the temperature-responsive element, so that the latter may be fully exposed to the area to be protected.

In this case the heat-responsive element may effect shattering of the frangible body by directly acting on an elongate ram or other thrust member extending through an aperture in the central part of the water distributor, but other mechanisms could be used; e.g., it could release a latch holding back a spring-loaded ram.

It is normally desirable that the shattering means applies no substantial force to the frangible body unless and until the heat-responsive element is actuated by the occurrence of the said predetermined temperature-rise conditions.

The frangible body may be of glass or ceramic material, or of other material of a suitably rigid and brittle nature. It may be a flat or domed disc, but it could take other forms, for example a tube. In appropriate cases, it may be heat-treated, scored or otherwise processed to ensure a distribution of locked-in stresses that is conducive to shattering into small pieces which cannot seriously impede fluid flow.

When the frangible body is of ceramic, the thrust member may be made in one piece with it; when separate, the thrust member is preferably made of or tipped with a material harder than the surface to the frangible member.

When the frangible body is a disc, it is preferably sealed to the body of the sprinkler without gripping its edges.

The body of the device may be of brass, in which case the temperature-responsive element is preferably thermally insulated from it by spacers (e.g. washers) of polymeric material, ceramic or glass. Alternatively, however, the body itself may be made wholly or partly of a suitably tough vitreous or ceramic material (in which case it may be possible for the frangible body to be made in one piece with it), or (for use in installations where the risk of flame directly impinging on the sprinkler before it operates can be discounted) of a suitable polymeric material. A thermoplastic material can be used, provided its softening temperature is well above the response temperature of the temperature-responsive element, but thermosets may be preferred. In either case, fire-retardant grades may be recommended. Apart from the advantage of inherent thermal insulation, a polymeric body is more suited to aesthetic design treatment and can be self-gasketing and less expensive than a metal body. Creep resistance is not required, because the temperature-responsive mechanism can be designed to impose no forces on the body in the quiescent state.

The invention will be further described, by way of example, with reference to the accompanying drawings which show various designs of prototype sprinkler in accordance with the invention.

Figure 1:
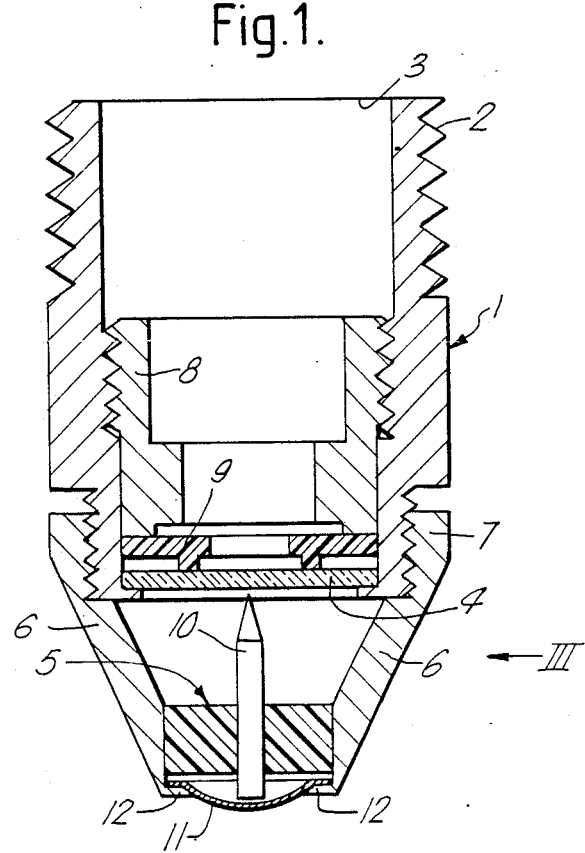
FIG. 1 is a longitudinal (vertical) section through a first prototype.

The prototype sprinkler of FIGS. 1-6 comprises a body 1 of brass or other suitable metal with an external screw thread 2 for screwing to a fluid supply pipe in the usual way. The inlet 3 is at the upper end of the body (in its usual orientation, as shown) and the outlet is at its lower end and closed by a frangible glass disc 4. This is secured in a fluid-tight manner by a metal collar 8 screwed into a thread cut inside the body and acting through a sealing ring 9 of a hard plastics material such as nylon 66 which is stepped so as to bear on the glass disc and thus seal it to the body without gripping its edges, as a precaution against broken pieces remaining gripped and not falling away. Many other plastics materials are suitable for making the sealing ring e.g. acetal polymers (such as the material sold under the trademark DELRIN), polyether sulphones, polyether ketones, polycarbonates, acrylics, nylon 6, and nylon 11.

Beyond the outlet is a water-deflector 5 supported by a pair of legs 6,6 from a ring 7 screwed to the body 1. The water deflector 5 (made of any suitable plastics material, or of metal, in which case it could be made in one piece with legs 6 and ring 7) also acts as a guide for a hardened steel pin serving as a thrust member 10 which rests loosely on an actuator element 11 of a shape-memory alloy. This is supported by four claws 12 (best seen in FIGS. 2-4) depending from the legs 6 so as to have a large exposed area and relatively little heat-conducting contact.

Figure 5:
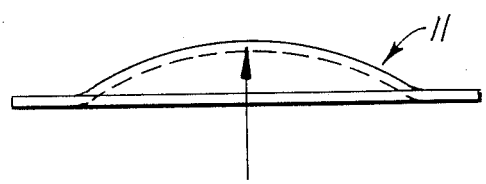
FIG. 5 is a side elevation of the shape-memory alloy actuator used in the first and several other prototypes.
Figure 2:
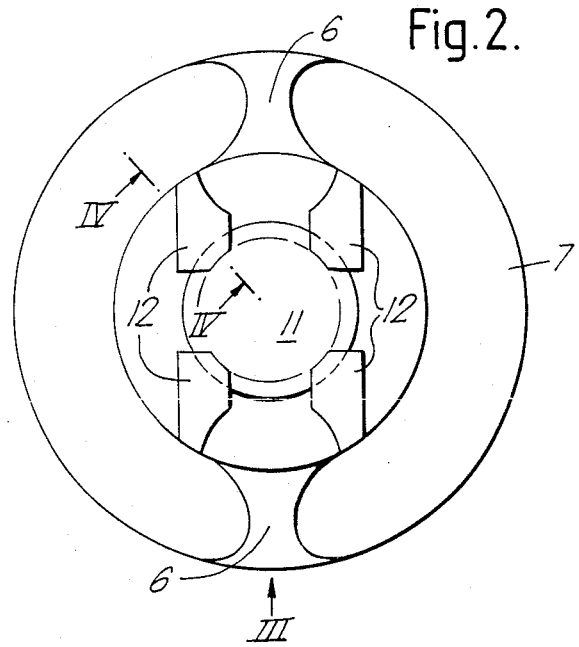
FIG. 2 is an underneath plan view of the first prototype.
Figure 3:
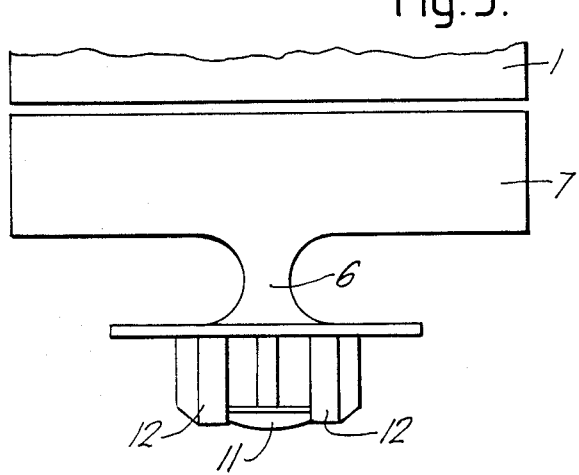
FIG. 3 is a partial elevation in the direction of the arrows III,III in FIGS. 1 and 2.
Figure 4:
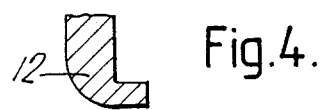
FIG. 4 is a fragmentary cross-section on the line IV—IV in FIG. 2.

FIG. 5 shows the shape of the shape-memory alloy element, which is made from nickel-titanium shape-memory alloy-sheet 0.5 mm thick-heat treated for 1 hour at 500° C. while clamped flat and then, after cooling, domed to a height of 1.2 mm by pressing centrally with a steel ball 12 mm in diameter while clamping the edges. Domed actuator elements made in this way recover to a nominally flat shape at a temperature in the region of 70° C. and in doing so generate large forces if restrained: we have observed forces up to 57.7 kg weight (556N). While discs of any ordinary glass can easily be broken by the available force, it has been found that reliable shattering into small pieces that will not impede the flow of water is greatly assisted by the use of glass with large locked-in stress—Best results to date have been obtained with glass supplied by Corning Glass Works of Corning, NY 14830 USA under their identification code 0313. This is a glass strengthened (and thus made more brittle) by sodium-ion exchange, used mainly for aircraft windows and tape-reel flanges; according to the manufacturer's data, it has a density of 2.46 kg/m$^3$, Youngs Modulus $7 \times 10\ 4MN/m^2$, Poisson's Ration 0.22, Shear Modulus $2.9 \times 104\ MN/m^2$, Modulus of Rupture (abraded) 300 MN/m$^2$ and Knoop Hardness (at 100 g load) 5780 MN/m$^2$.

This glass was supplied in discs 22.2 mm (⅞ths of an inch) in diameter and 2.1 mm (1/12th of an inch) thick. Its extreme surface hardness makes it advisable to use a thrust member made of or tipped with a very hard material (e.g. tungsten or a hard ceramic such as alumina or zirconia): hardened steel thrust members are liable to bend rather than penetrate the surface.

Another suitable glass (which is less hard and can be used with hardened steel actuator members) has built-in stresses resulting from a heat-treatment substantially the same as used for toughened glass windscreens and is available from Pilkingtons (New Business Development Unit) Limited of St Helens, Merseyside, England in the form of discs 22 mm in diameter and nominally 2 mm thick.

Figure 6:
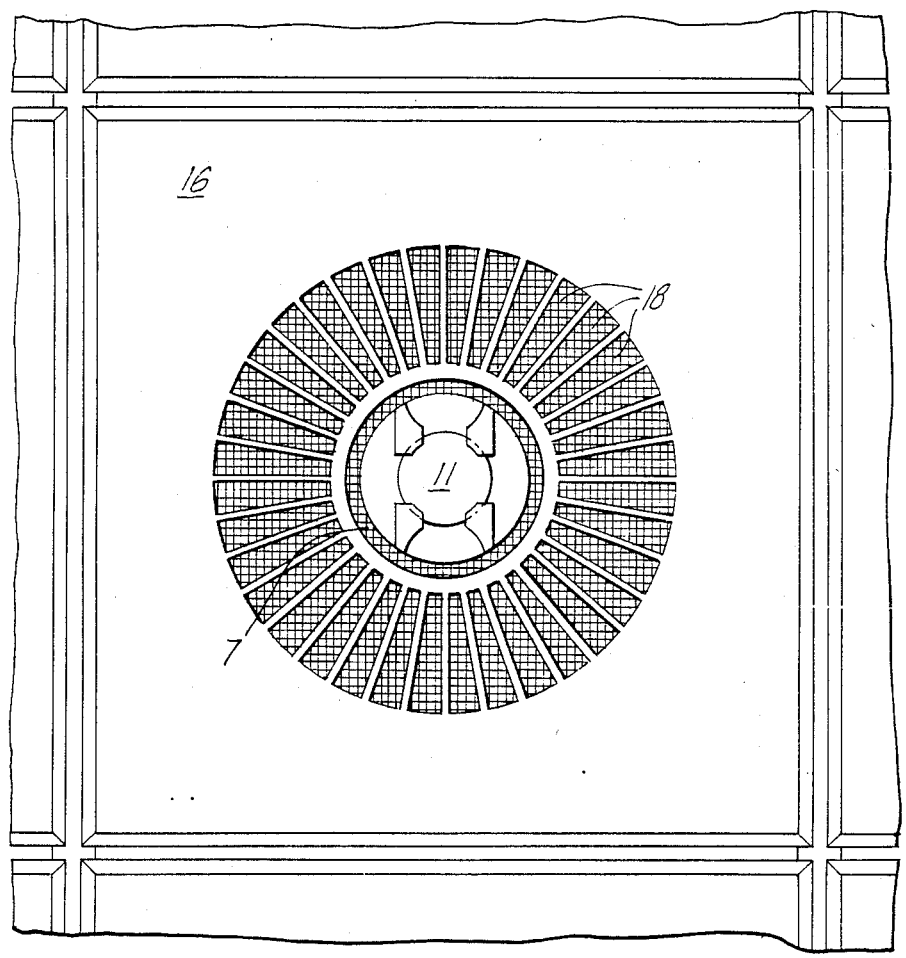
FIG. 6 is an underneath plan showing one way in which the first prototype could be treated as an aesthetic feature in a suspended ceiling installation.

As seen, by way of example, in FIG. 6, the sprinkler design lends itself to aesthetic treatment by placing it behind a ceiling tile 16 with a central aperture 17 through which the disc 11 and little else is visible and a ring of apertures 18 through which water can flow when necessary (and by which it may be deflected if desired.)

Figure 7:
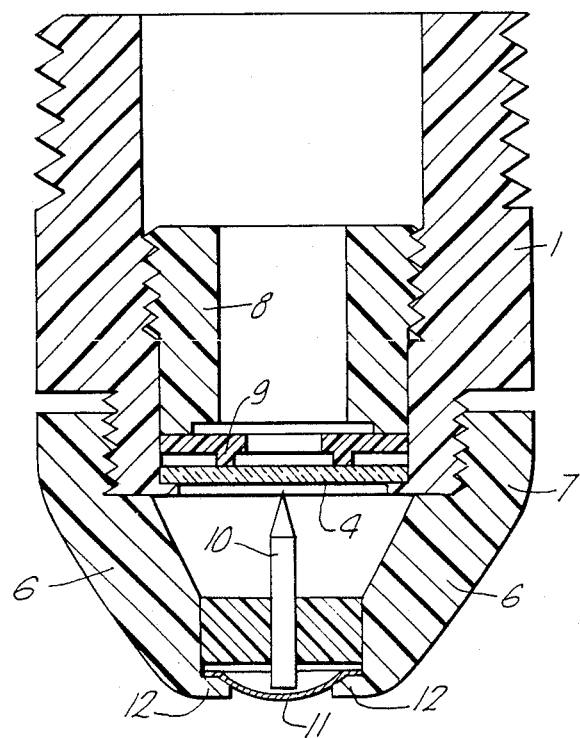
FIGS. 7-11 and 13-19 are longitudinal (vertical) sections each through a different prototype.

The prototype of FIG. 7 is identical in principle to the one of FIGS. 1-6, but its major structural components 1,6/7 and 8 are redesigned for fabrication in a suitable plastics material (such as filled polyamide or polyimide, polysulphone, polyetherketone, or polyether.)

Figure 8:
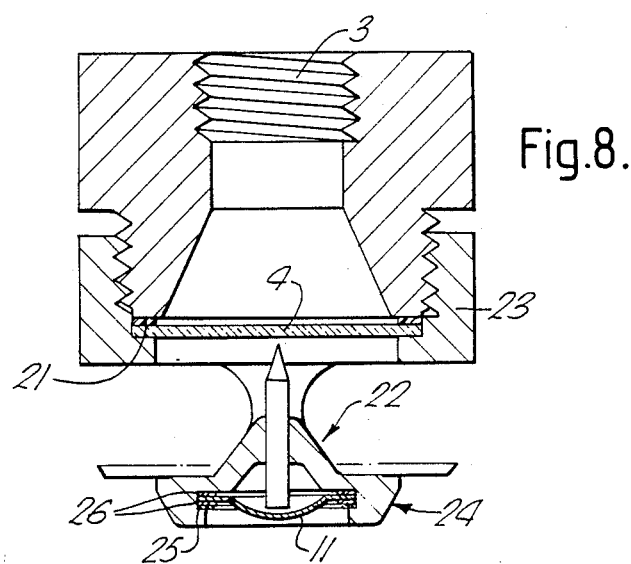

In the prototype design of FIG. 8, the fluid passage extends from inlet 3 to an outlet closed by a frangible glass disc 4 sealing in this case conjunction with a simple washer 21 (e.g. of PTFE) and a body 22 of the upper part 23 of which takes the form of a gland nut.

The lower part 24 of the body is shaped to form a distributor for the water (or other fluid) that will impinge on it if the disc 4 is shattered and also to accommodate an actuator element 11 in the same general form as before. The element 11 is secured by a circlip 25 and loosely supports the thrust member 10. A pair of ceramic rings 26 provide thermal insulating between the element 11 and the body 22.

In a particular series of prototypes made in accordance with FIG. 8, the frangible discs 4 were 1.0 mm thick and 20 mm in diameter, and were cut from soda-glass microscope slides using a diamond-tipping shell cutter (designed for cutting holes in flat glass). Discs that did not evidenced internal stresses on examination under polarised light were rejected. As a further precaution against the discs breaking into large pieces that might obstruct the flow of fluid, they were scored by adhering them to the faceplate of a lathe and using a diamond tip glass cutter mounted in guides and subjected to light hand force in a concentric circle 18 mm in diameter. The washer 5 was of PTFE and was 0.5 mm thick and the thrust member 10 was of hardened steel and 2 mm in diameter.

The shape-memory actuator element 11 was made from 0.5 mm thick nickel-titanium shape-memory alloy sheet heat-treated for 30 minutes at 440° C. while clamped flat, quenched into water and domed by cold-drawing until its height was 2.75 mm. Recovery temperature was about 70° C.

Figure 9:
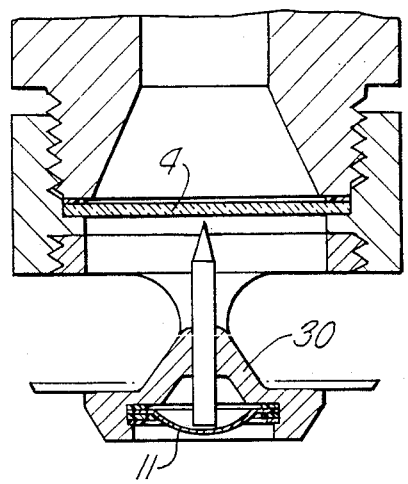

The sprinkler shown in FIG. 9 is similar to that of FIG. 8 except that the body member 30 can be unscrewed, without disturbing the mounting of the frangible disc 4, to allow the shape-memory temperature-responsive element 11 to be removed and replaced as desired. In designs for public-access buildings, a secure key-operated connection can be substituted for the simple screwed one shown.

FIGS. 10-14 illustrate a series of alternative designs using frangible members of ceramic material instead of glass.

Figure 10:
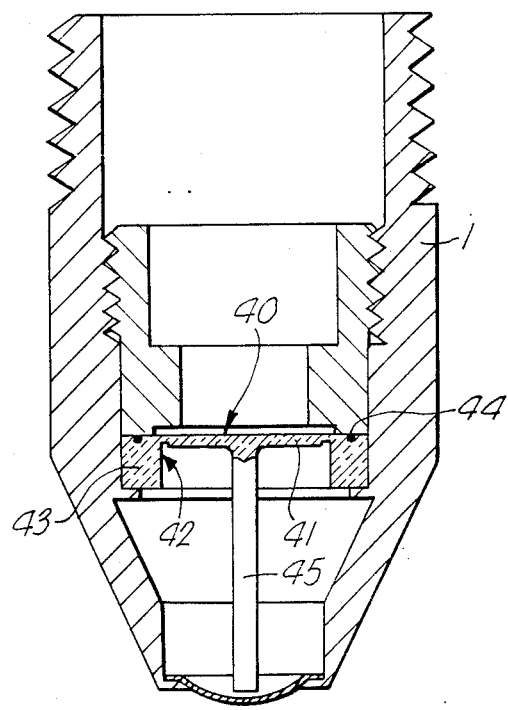

In the sprinkler of FIG. 10, the frangible member 40 comprises a flat disc 41 weakened around its periphery by a groove 42 and mounted in the outlet of the body 1 by an integral collar 43 and an O-ring seal 44; the thrust member 45 is also made in one piece with the frangible member. The composite frangible ceramic body may be made by isostatic pressing from slurry of any appropriate technical ceramic, or may be machined from one of the machinable ceramics, e.g. the one sold by Aremco Products Ind of P.O. Box 429 Ossining N.Y. 10562, USA under the trademark "AREMCOLOX" or the "machinable glass ceramic" sold by Corning Glass Works under the trademark "MACOR".

Figure 11:
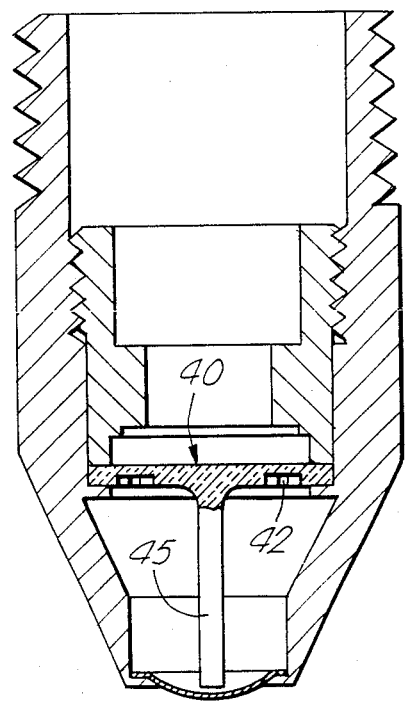
Figure 12:
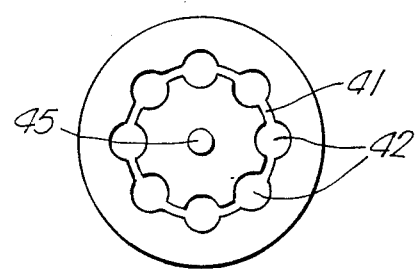
FIG. 12 is an underneath plan view of a one-piece frangible body and actuating member used in the design of FIG. 11.

FIGS. 11 and 12 show a modification of this design in which the frangible ceramic body 40 is machined and is weakened by a turned groove 41 and a plurality of milled blind bores 42. In this case, a polymeric gasket 43 is used for sealing.

Figure 13:
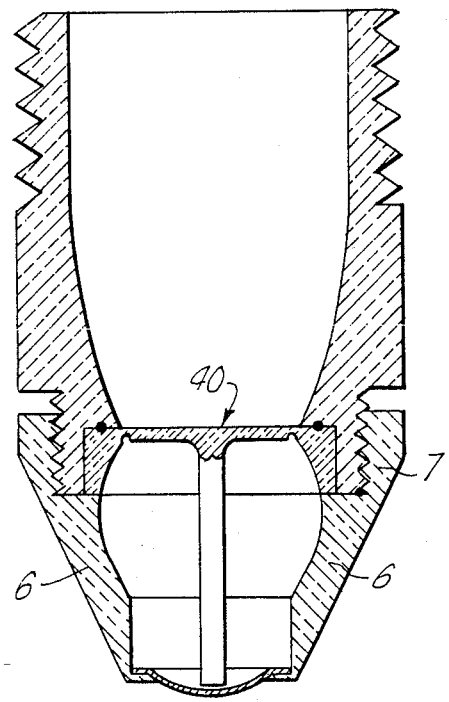

FIG. 13 shows another modified version of the design of FIG. 10 in which the body members (1,6,7) also are made of ceramic material.

Figure 14:
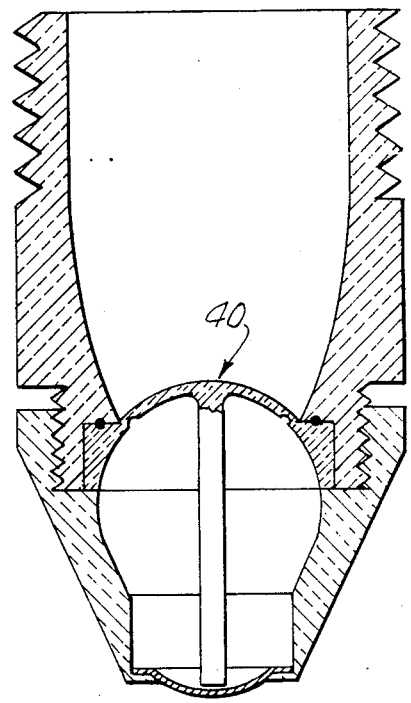

FIG. 14 shows another variation in which the frangible body 40 is domed.

Figure 15:
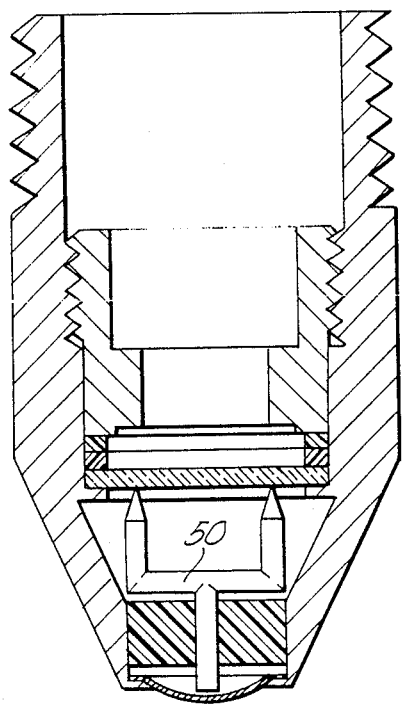

FIG. 15 shows a modification of the design of FIG. 1 in which the thrust member 50 is bifurcated. This is designed to comply with the current conventional requirement for a sphere of specified size to pass freely through the water passage of a sprinkler after actuation.

Figure 16:
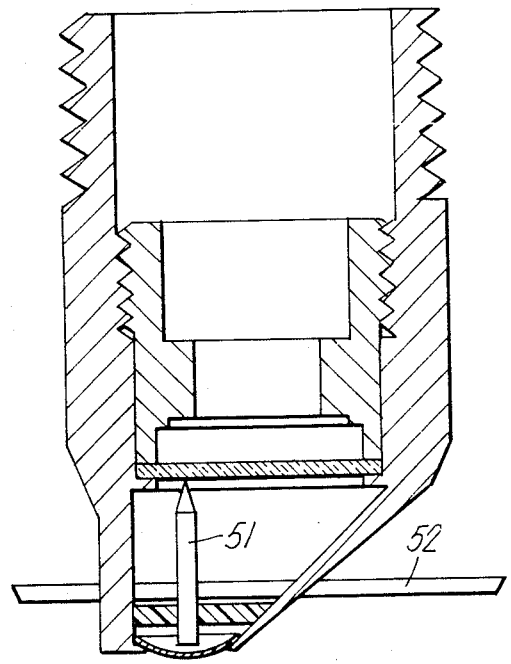

FIG. 16 illustrates another modification for the same purpose in which the thrust member 51 is eccentrically positioned. This necessitates the use of a separate water-deflector plate 52 to restore a symmetrical water distribution.

Figure 17:
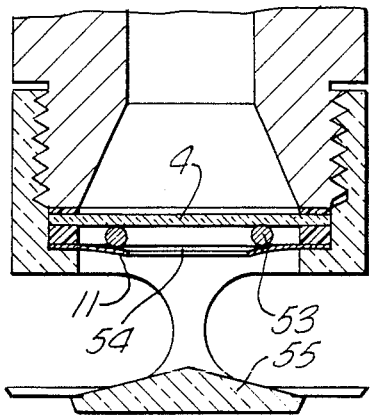

FIG. 17 shows another design, in which the temperature-responsive shape-memory element 11 is placed much closer to the frangible disc 4 and acts on it through a ring 53; a central aperture 54 through the element allows the water (or other fluid) to pass freely through to the distributor 55 after the disc 4 has shattered. In this design it is desirable for the body, or at least the fluid distributor 15, to be made of a material (such as silica glass) that transmits a substantial part of the infra-red wavelength range, in order to avoid insensitivity to a fire breaking out immediately below the sprinkler.

Figure 18:
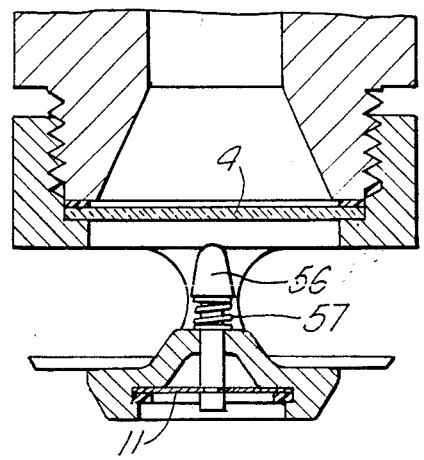

FIG. 18 shows another variant design in which the shape-memory actuator element 11 does not directly produce the force necessary to shatter the frangible disc 4. Instead, the change in its shape when it recovers releases a bolt 56 which is then driven through the frangible disc by the stored energy of a coil spring 57.

Figure 19:
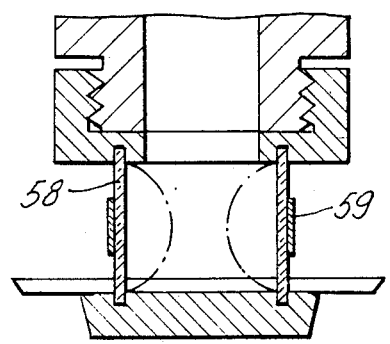

FIG. 19 shows another variant design (not a recommended one, especially for applications in which sensitivity to radiant heat is required) in which the frangible body 58 is tubular and the temperature-responsive element is a ring 59 of a shape-memory alloy which reduces in diameter on recovery.

Samples of certain prototypes were subjected to tests in accordance with the procedures set out by the Loss Prevention Certification Board of Melrose Avenue, Boreham Wood, Hertfordshire WD6 2BJ England, in Loss Prevention Standard LPS 1039: Issue 2:6:4:87 entitled Requirements and Testing Methods for Automatic Sprinklers, except that in the tests requiring a wind tunnel, the tunnel was not of the dimensions specified but was rectangular with a cross-section 70×90 mm.

These tests used predominantly (forced) convective heating, in order to establish performance under worst conditions. The tests applied were as follows:

1. In a water-bath test according to Section 7.4 of the Standard the nominal release temperature of the prototype were measured.

2. Performance was compared with conventional sprinkler designs in the 'plunge test' of Section 8.5.1 of the Standard.

3. In a rate-of rise test following section 8.3.2 of the Standard, samples were mounted in a tunnel through which air was blown, the air temperature being steadily raised by electric heaters.

Time of actuation and the corresponding temperature were recorded and the rate-of-rise time constant $\tau$ calculated The Prototypes tested were as follows:

Prototype A: According to FIG. 1.

Prototype B: As Prototype A, except that the actuator disc was held by a continuous rim instead of the four claws 12.

Prototype C: Intermediate Prototypes A and B, formed by milling a single slot through the rim rather than the two slots required to form the claws 11.

Prototype D: According to FIG. 8, except that the thrust member was flat topped.

In the water-bath test, the nominal release temperature of Prototype B was found to be 50.3° C. (for comparison, a standard glass bulb sprinkler with a declared release temperature of 68%C was tested and gave a value of 72° C., and a fusible link sprinkler gave a value of 75.8° C.)

In the plunge test, in which the measure air temperature ranged from 194° to 198° C., response times (in seconds) were as follows:

| TYPE | ORIENTATION | RESPONSE TIME |
|---|---|---|
| Prototype A | A | 5.6 |
| Prototype A | A | 7.2 |
| Prototype B | A | 10.6 # |
| Prototype B | N | 11.7 |
| Prototype B | N | 11.9 |
| Prototype C | A | 14.3 |
| Prototype C | A | 12.3 |
| Prototype C | A | 15.0 # |
| Prototype C | N | 6.8 |
| Prototype C | N | 4.9 |
| Prototype D | N | 25 |
| Prototype D | H | 22 |
| and for comparison | | |
| Glass bulb | N | 35.2 |
| Glass bulb | N | 32.8 |
| Glass bulb | N | 33.1 |
| Glass bulb | N | 43. |
| Glass bulb | N | 53. |
| Glass bulb | H | 38 |
| Fusible link | A | 5.0 |
| Fusible link | N | 4.1 |
| Fusible link | N | 21 |

A = pendant with support legs aligned with gas flow.
N = pendant with support legs normal to gas flow.
H = horizontal
These samples actuated with violent snap action, presumably because of unintended restraint at the edges of actuator disc The "$\tau p$" factor of Prototype D was calculated as 79 compared with 67 for the third fusible link sample and 169 for the fourth and fifth glass bulb samples.

In the rate-of-rise test, made with Prototype D only, using a rate of rise of air temperature of 7.5° C./min (nominal), a first sample operated after 10 minutes 42 secs at an air temperature of 93° C.; a second sample after 9 minutes 34 seconds at 92° C. When the rate of rise was increased to 14° C./min, operation occured after 6 minutes 53 secs and at 110° C. at 20° C./min, one sample operated after 5 minutes 8 secs at 121° C. and another 5 minutes 39 secs at 128° C. From these measurements, the rate-of-rise time constant $\tau$ was estimated at 2.35 minutes.

What we claim as our invention is:

1. A fire sprinkler comprising a flow passage extending from an inlet to an outlet, a fluid distributor positioned beyond the outlet, a frangible body closing the flow passage, separate means actuated by a temperature-responsive element of a shape-memory alloy for shattering the frangible body to allow passage of fluid on detection of predetermined temperature-rise conditions, said element itself generating the force required to shatter said frangible body.

2. A sprinkler as claimed in claim 1 in which the shape-memory alloy is in sheet or like extended form.

3. A sprinkler as claimed in claim 1 in which the shape-memory alloy is in the form of a sheet distorted into a dome and recoverable towards a flat sheet.

4. A sprinkler as claimed in claim 1 in which the fluid distributor is located between the outlet and the temperature-responsive means.

5. A sprinkler as claimed in claim 1 in which the frangible body is a disc which is heat-treated, scored or otherwise processed to ensure a distribution of locked-in stresses conducive to shattering into small pieces.

6. A sprinkler as claimed in claim 1 comprising a metal body and in which the temperature-responsive means is thermally insulated from the metal body.

7. A sprinkler as claimed in claim 1 having a body made wholly or partly of a vitreous or ceramic material.

8. A sprinkler as claimed in claim 1 having a body made at least partly of polymeric material in which no substantial forces act on the said polymeric material unless and until the heat responsive element is actuated by the occurence of said predetermined temperature-rise conditions.

9. A fire sprinkler comprising a flow passage extending from an inlet to an outlet, a fluid distributor positioned beyond said outlet, a frangible disc closing said flow passage and processed to ensure a distribution of locked-in stresses conducive to shattering into small pieces, and separate temperature-responsive means for shattering said disc to allow passage of fluid on detection of predetermined temperature-rise conditions.

* * * * *

UNITED STATES PATENT AND TRADEMARK OFFICE
CERTIFICATE OF CORRECTION

PATENT NO. : 4,896,728

DATED : January 30, 1990

INVENTOR(S) : Heinz S. Wolff and David W. Hawes

It is certified that error appears in the above-identified patent and that said Letters Patent is hereby corrected as shown below:

Column 1, line 53, change "cloning" to --closing--;

Column 3, line 36, change "thick-heat treated" to --thick heat-treated--;

Column 3, line 55, change "10 4" to --$10^4$--;

Column 3, line 56, change "104" to --$10^4$--.

Column 4, line 35, change "tipping" to --tipped--;

Column 4, line 37, change "evidenced" to --evidence--;

Column 6, line 57, change "τp" to --τρ--.

Signed and Sealed this

Twelfth Day of March, 1991

*Attest:*

HARRY F. MANBECK, JR.

*Attesting Officer*   *Commissioner of Patents and Trademarks*